US012078416B2

(12) United States Patent
Ahrenfeldt et al.

(10) Patent No.: US 12,078,416 B2
(45) Date of Patent: Sep. 3, 2024

(54) SLURRY DRYING PLANT, A METHOD FOR DRYING SLURRY AND USE OF A SLURRY DRYING PLANT

(71) Applicants: Danmarks Tekniske Universitet, Kongens Lyngby (DK); AquaGreen License ApS, Tisvildeleje (DK)

(72) Inventors: Jesper Ahrenfeldt, Frederiksvæk (DK); Ulrik Birk Henriksen, Kgs. Lyngby (DK); Tobias Pape Thomsen, Ringsted (DK); Claus Thulstrup, Tisvildeleje (DK)

(73) Assignees: DANMARKS TEKNISKE UNIVERSITET, Kongens Lyngby (DK); AQUAGREEN LICENSE APS, Tisvildeleje (DK)

( * ) Notice: Subject to any disclaimer, the term of this patent is extended or adjusted under 35 U.S.C. 154(b) by 536 days.

(21) Appl. No.: 17/289,540

(22) PCT Filed: Nov. 1, 2018

(86) PCT No.: PCT/DK2018/050277
§ 371 (c)(1),
(2) Date: Apr. 28, 2021

(87) PCT Pub. No.: WO2020/088719
PCT Pub. Date: May 7, 2020

(65) Prior Publication Data

US 2021/0396466 A1 Dec. 23, 2021

(51) Int. Cl.
*F26B 1/00* (2006.01)
*F26B 3/14* (2006.01)
(Continued)

(52) U.S. Cl.
CPC .................. *F26B 1/00* (2013.01); *F26B 3/14* (2013.01); *F26B 17/12* (2013.01); *F26B 17/18* (2013.01);
(Continued)

(58) Field of Classification Search
CPC .... F26B 1/00; F26B 3/14; F26B 17/12; F26B 17/18; F26B 21/005; F26B 23/028; F26B 2200/18
See application file for complete search history.

(56) References Cited

U.S. PATENT DOCUMENTS 3,882,610 A 5/1975 Bouldoires et al.
3,978,822 A 9/1976 Smith
(Continued)

FOREIGN PATENT DOCUMENTS

CL 197600519 6/1977
CL 199101216 7/1991
(Continued)

OTHER PUBLICATIONS

International Search Report and Written Opinion for PCT/DK2018/050277, dated Jun. 13, 2019, 11 pages.
(Continued)

*Primary Examiner* — David J Laux
(74) *Attorney, Agent, or Firm* — BLANK ROME LLP

(57) ABSTRACT

Disclosed is a slurry drying plant (1) comprising a slurry extruder (3) including a slurry inlet (2) and conveying means (4) arranged to convey the slurry through the slurry extruder (3) and force the slurry out of a plurality of exit openings (5) of the slurry extruder (3) to form a plurality of slurry strings (7), wherein the slurry strings (7) are forced out into a drying chamber (8) in which the plurality of slurry strings (7) is dried. The slurry drying plant (1) further comprises slurry heating means (6) comprising flow means for passing super-
(Continued)

Figure 1:
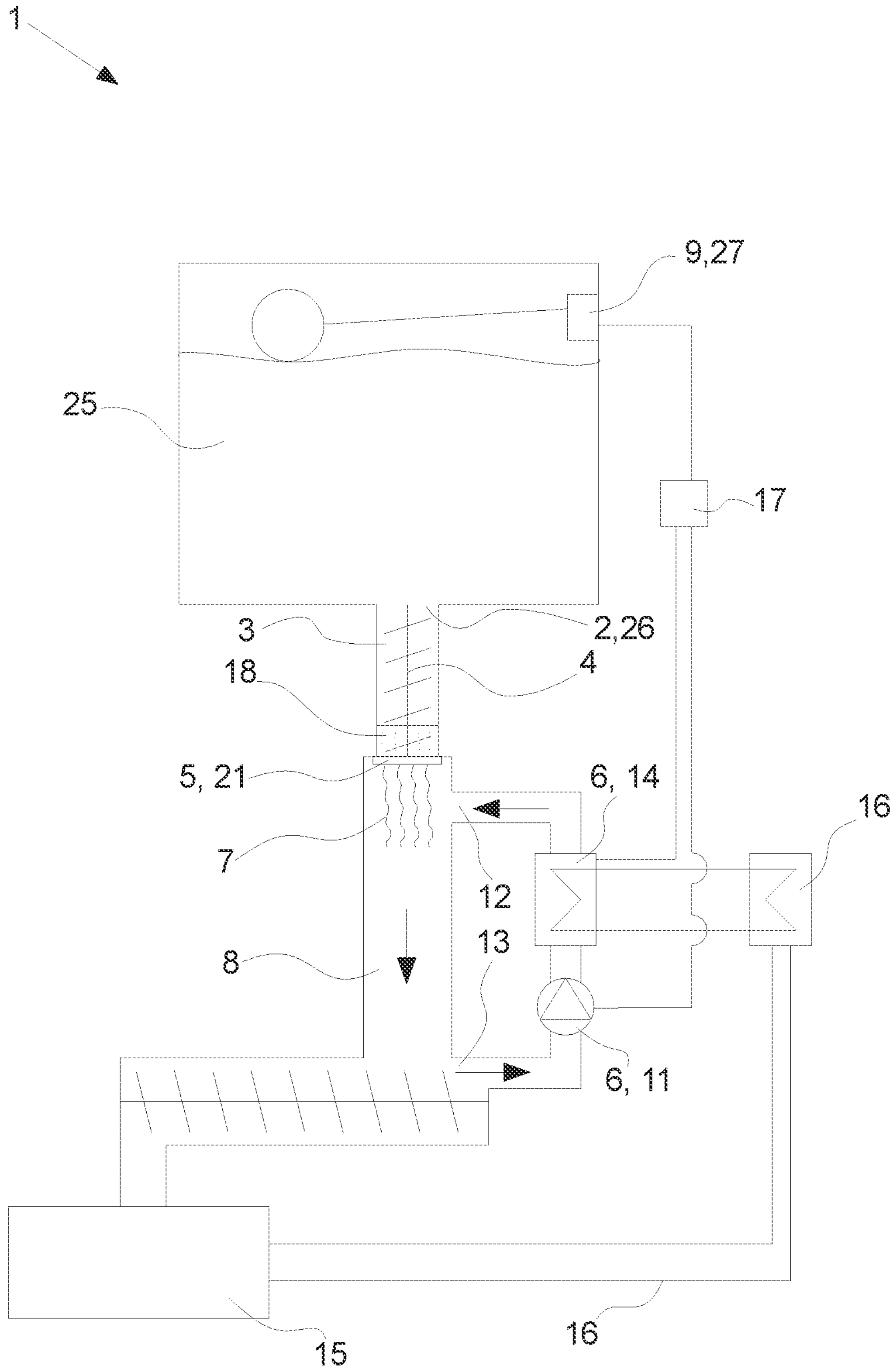

heated steam past the slurry strings (7) in the drying chamber (8), and inlet pressure detection means (9) for detecting a slurry inlet pressure at the slurry inlet (2). The slurry drying plant (1) also comprises control means (17) arranged to control the conveying speed of the conveying means (4) in response to the slurry inlet pressure. Furthermore, a method for drying slurry and use of a slurry drying plant (1) is disclosed.

25 Claims, 3 Drawing Sheets

(51) Int. Cl.

| | |
|---|---|
| ***F26B 17/12*** | (2006.01) |
| ***F26B 17/18*** | (2006.01) |
| ***F26B 21/00*** | (2006.01) |
| ***F26B 23/02*** | (2006.01) |

(52) U.S. Cl.

CPC .......... *F26B 21/005* (2013.01); *F26B 23/028* (2013.01); *F26B 2200/18* (2013.01)

(56) References Cited

U.S. PATENT DOCUMENTS

| | | | | |
|---|---|---|---|---|
| 5,900,139 | A | 5/1999 | Bielfeldt | |
| 6,163,980 | A * | 12/2000 | Van Poppel | F26B 11/0472 34/95 |
| 2008/0314842 | A1* | 12/2008 | Ben Yaacov | C02F 11/00 210/748.16 |
| 2010/0132592 | A1* | 6/2010 | Nagamizu | C04B 33/1321 110/238 |
| 2011/0271649 | A1 | 11/2011 | Tetzlaff | |
| 2013/0014678 | A1* | 1/2013 | Knoer | F26B 23/028 34/477 |
| 2015/0075024 | A1* | 3/2015 | Permuy Dobarro | F26B 25/001 34/236 |
| 2017/0227288 | A1* | 8/2017 | Pardo | F26B 23/005 |
| 2017/0328635 | A1* | 11/2017 | Kreuzer | F26B 13/12 |

FOREIGN PATENT DOCUMENTS

| | | | |
|---|---|---|---|
| CN | 1193653 | A | 9/1998 |
| CN | 1274687 | A | 11/2000 |
| CN | 101101171 | A | 1/2008 |
| CN | 101573576 | A | 11/2009 |
| CN | 203478891 | U | 3/2014 |
| CN | 206384571 | U | 8/2017 |
| CN | 107934454 | A | 4/2018 |
| CN | 207738095 | U | 8/2018 |
| EP | 1343710 | A1 | 9/2003 |
| EP | 3361198 | A1 | 8/2018 |
| EP | 3421913 | A1 | 1/2019 |
| ES | 2323029 | A1 | 7/2009 |
| JP | 2006-7025 | A | 1/2006 |
| JP | 2006-153376 | A | 6/2006 |
| JP | 2008-207911 | A | 9/2008 |
| KR | 101597765 | B1 | 2/2016 |
| WO | WO-89/00888 | A1 | 2/1989 |
| WO | WO-00/71222 | A2 | 11/2000 |
| WO | WO-2008/080788 | A2 | 7/2008 |

OTHER PUBLICATIONS

Database WPI Section PQ, Week 20097, Thomson Scientific, London, GB, XP002791797, Jul. 3, 2009, 1 page.

* cited by examiner

SLURRY DRYING PLANT, A METHOD FOR DRYING SLURRY AND USE OF A SLURRY DRYING PLANT

RELATED APPLICATION

This application is a national phase of PCT/DK2018/050277, filed on Nov. 1, 2018. The entire contents of that application is hereby incorporated by reference.

FIELD OF THE INVENTION

The invention relates to a slurry drying plant comprising a slurry extruder including conveying means arranged to force the slurry out of a plurality of exit openings of the slurry extruder to form a plurality of slurry strings. The invention further relates to a method for drying slurry and use of a slurry drying plant.

BACKGROUND OF THE INVENTION

Organic slurry such as slurry from sewage treatment, farming, aquaculture, biochemical production, food production or other is problematic in that it is difficult and expensive to handle, store and dispose, it can contain drug residues, virus or other and it can emit bad smells or environmentally damaging gasses such as ammonium.

A solution would be to dry the slurry to reduce or even substantially removed the water content of the slurry and thereby reduce or even completely eliminate the abovementioned problems.

Thus, from the US patent application WO 89/00888 A1 an apparatus for extruding and drying organic waste material by means of hot flue gas is known. To ensure that all the extruded strings are dried evenly—i.e. to ensure that some strings are not dried so hard that they catch fire and others are not dried sufficiently—the extruder is provided with rotating knife sets and perforated discs to ensure that all the strings are extruded with essentially the same velocity. But such a design is expensive and complex.

It is therefore an object of the present invention to provide for a cost-efficient technique for drying slurry.

THE INVENTION

The invention provides for slurry drying plant comprising a slurry extruder including a slurry inlet and conveying means arranged to convey the slurry through the slurry extruder and force the slurry out of a plurality of exit openings of the slurry extruder to form a plurality of slurry strings, wherein the slurry strings are forced out into a drying chamber in which the plurality of slurry strings is dried. The slurry drying plant further comprises slurry heating means comprising flow means for passing superheated steam past the slurry strings in the drying chamber, and inlet pressure detection means for detecting a slurry inlet pressure at the slurry inlet. The slurry drying plant also comprises control means arranged to control the conveying speed of the conveying means in response to the slurry inlet pressure.

Drying by means superheated steam is particularly advantageous in relation with drying slurry strings being forced out of a slurry extruder, in that no matter how uneven the strings are forced out of the extruder—i.e. uneven velocity, uneven density and/or other—the string cannot be dried so hard that they catch fire in that the superheated steam will displace any air and/or oxygen in the system and thereby inhibit any form of combustion. Thus, according to the present plant all the slurry string can be heated so hard that even the densest and fastest moving slurry strings will be dried sufficiently without risking that the slower moving and loose slurry strings will catch fire.

However, to ensure that air does not enter the slurry extruder or the drying chamber it is important that the slurry extruder does not run out of slurry or that air-containing gaps are formed in the otherwise continues slurry stream. Thus, it is advantageous to make the slurry drying plant comprise control means arranged to control the conveying speed of the conveying means in response to the slurry inlet pressure, to ensure that the conveying speed is reduced or even stopped if the slurry inlet pressure decreases—to protect against air ingress—and to ensure that the conveying speed is increased if the slurry inlet pressure is increased to increase the capacity of the slurry drying plant.

Even further, when subsequently condensing the steam, the surplus heat can be reused in the slurry drying plant or e.g. fed to a central/district heating system.

It should be emphasised that the term “slurry” is to be understood as any kind of organic liquid manure, fertilizer, inorganic slurry, mud, sludge or similar liquids or semi-liquids in the form of a watery mixture of primarily insoluble matter i.e. a thick mixture of liquid and another at least substantially solid substance.

Furthermore, in this context the term “conveying means” should be understood as any kind of screw conveyer, double screw conveyer, belt conveyer, slurry pump, piston pump, wheel conveyer or other or any combination thereof or any other kind of conveyer suitable for conveying slurry through a slurry extruder and force the slurry out of exit openings in the slurry extruder.

Also, in this context the term “slurry heating means” should be understood as any kind of heater, oven, furnace, boiler, heat exchanger, heat blower or other or any combination thereof or any other kind of slurry heater suitable for heating slurry by passing superheated steam past the slurry strings.

It should also be emphasised that the term “flow means” is to be understood as any kind of piping, fan, blower, duct or similar or any combination thereof or any other kind of steam flow generator suitable for generating a steam flow past the slurry strings in the drying chamber.

It should further be emphasised that the term “inlet pressure detection means” is to be understood as any kind of inlet pressure detector suitable for detecting the slurry inlet pressure directly—e.g. by means of a pressure gauge or a manometer placed at or near the slurry inlet—or indirectly e.g. by means of a pressure gauge placed further away from the slurry inlet but from which it would still be possible to deduce the pressure at the slurry inlet relatively precisely or by means of other types of detectors—such as some sort of level meter capable of detecting a level in a preceding slurry tank in that the slurry inlet level can be deduced from the slurry level in this tank—or any other type of indirect inlet pressure detectors e.g. incorporating scales, flow meter, ultrasonic sensors or any combination thereof. This means that the term “slurry inlet pressure” in this context has to be interpreted broadly—i.e. to also include pressure deduced from measurements regarding weight, volume, flow of the slurry e.g. combined with knowledge of the density of the slurry or other.

Also, in this context, the term “control means” should be understood as any kind of controller capable of controlling the operation of at least parts of the drying plant—i.e. any kind of logic circuit, Programmable Logic Controller (PLC), computer or other.

In an aspect of the invention, the exit openings are arranged to extrude the slurry downwards.

Extruding the slurry strings downwards is advantageous in that it reduces the risk of the strings breaking before they are sufficiently dried. If they e.g. were extruded horizontally the force of gravity would pull them downwards and thereby increase the risk of breaking them.

In an aspect of the invention, the drying plant comprises a slurry tank and a slurry conduit arranged to guide the slurry from the slurry tank to the slurry inlet.

Hereby is achieved an advantageous embodiment of the invention.

In an aspect of the invention, the slurry tank is arranged above the slurry inlet so that the slurry is guided through the slurry conduit by means of gravity.

Arranging the slurry tank above the slurry extruder and thereby the slurry inlet is advantageous in that the slurry hereby can be guided down into the slurry extruder simply by means of gravity.

In an aspect of the invention, the inlet pressure detection means comprises a level meter arranged to detect a slurry level in the slurry tank.

Detecting the level of slurry in the tank is a simple and inexpensive way of establishing a slurry inlet pressure, in that the pressure at the slurry inlet can easily be deduced when the density of the slurry is (approximately) know, when the volume of tank is known and when the level of slurry in the tank is known.

In an aspect of the invention, the control means is arranged to control the slurry heating means in response to the slurry inlet pressure and/or the conveying speed of the conveying means.

It is advantageous to e.g. increase the effect the slurry heating means—e.g. by increasing the temperature of the steam, the flow speed of the steam or other—if the conveying speed is increased in that the increased conveying speed equals a larger slurry flow and that more energy is therefore needed to efficiently dry the slurry strings. And vice versa when the conveying speed is decreased.

In an aspect of the invention, the slurry drying plant is arranged for passing the superheated steam past the slurry strings substantially at atmospheric pressure.

Forming the slurry drying plant un-pressurized—i.e. the pressure inside the slurry drying plant is substantially equivalent to the outside pressure (atmospheric pressure)—is advantageous in that it is complex and expensive to form a slurry drying plant pressure tight In an aspect of the invention, the plurality of exit openings is arranged at an underside of the slurry extruder so that the slurry strings are primarily extruded downwards.

If the slurry strings are extruded upwards the risk of the wet slurry strings touching the walls of the drying chamber is increased. Thus, to avoid clogging and slurry build-up in the drying chamber it is advantageous to extrude the slurry strings downward.

It should be noted that the term "primarily extruded downwards" should be understood as all the slurry strings are extruded downwards but some of them more directly downwards than others. I.e. the term does not mean that a majority of the strings are extruded downwards while some can be extruded upwards.

In an aspect of the invention, the conveying means is a screw conveyor.

Screw conveyers are simple and efficient means for conveying and exerting a high pressure on a semi liquid substance.

In an aspect of the invention, the flow means is arranged to guide the superheated steam flow past the slurry strings substantially in the same direction as the slurry strings are extruded.

Guiding the superheated steam downstream is advantageous in that the slurry strings hereby will be dried the most as early as possible reducing the risk of strings comprising not sufficiently dried slurry breaking of. Also, if the steam was guided against the flow direction of the slurry strings the risk of light fragments being caught in the steam flow is increased—which could reduce the drying effect and increase the risk of premature string breakage.

In an aspect of the invention, the drying plant comprises an inlet pressure detection means arranged to measure the pressure of the slurry at a slurry inlet of the slurry extruder.

It is advantageous to measure the inlet slurry pressure in the extruder in that this measurement hereby can be used for operating the extruder or feed means arranged to feed the extruder more efficiently.

In an aspect of the invention, the drying plant comprises an exit pressure detection means arranged to measure the pressure of the slurry at the exit openings.

It is advantageous to measure the outlet slurry pressure in the extruder in that this measurement hereby can be used for ensuring a more unified string flow.

In an aspect of the invention, the drying plant comprises control means arranged to also control the operation of the slurry drying plant in response to input from the exit pressure detection means.

Hereby is achieved an advantageous embodiment of the invention.

In an aspect of the invention, the flow means comprises means for circulating at least a part of the superheated steam.

Circulating the superheated steam is advantageous in that it reduces energy consumption.

In an aspect of the invention, the slurry heating means comprises steam heating means for heating the superheated steam to an entrance temperature of between 110° C. and 400° C., preferably between 130° C. and 300° C. and most preferred between 150° C. and 250° C.

If the entrance temperature—i.e. the temperature of the steam when it enters the drying chamber and first comes in contact with the slurry—of the superheated steam is too high a torrefaction or pyrolysis process will commence, thus generating highly flammable gasses, poisonous gasses or other dangerous or damaging by-products which are not easy to handle when mixed the superheated steam. However, if the entrance temperature is too low the drying process will be inefficient and the capacity of the slurry drying plant is reduced. Thus, the present temperature ranges present an advantageous relationship between safety and efficiency.

It should be emphasised that the term "steam heating means" is to be understood as any kind of heat exchanger, boiler, heat pump or other or any other kind of steam heater suitable for heating steam in a slurry drying plant.

In an aspect of the invention, the slurry drying plant further comprises a subsequent thermal processing device in which slurry leaving the drying chamber is burned or pyrolyzed.

Subsequently putting the dried slurry through a combustion process or a pyrolysis process is advantageous in that the slurry hereby can be reduced to substantially harmless coke which is free from virus and drug residues and therefore can be used as fertilizer. Furthermore, the coke is easy to handle and store.

And it is advantageous to conduct this combustion process or pyrolysis process in a subsequent substantially separate thermal processing device in that the flue gas or other generated gasses can be easier and more efficiently handled when being separate from the superheated steam.

It should be noted that in this context the term “pyrolysis process” or “pyrolysed” also covers torrefaction which is a mild form of pyrolysis at temperatures typically between 200 and 320° C. depending on the specific slurry.

In an aspect of the invention, the slurry drying plant further comprises heat transferring means for transferring heat generated in or by the subsequent thermal processing device to the superheated steam.

A subsequent combustion process or pyrolysis process will generate much heat (when burning the flammable gasses generated in the pyrolysis process). And since producing the superheated steam requires much heat it is advantageous to transfer the generated heat and thereby reduce or avoid consumption of external power to generate the superheated steam.

It should be emphasised that the term “heat transferring means” is to be understood as any kind of heat exchanger, piping, blower or other or any combination thereof or any other kind of heat transferor suited for transferring heat generated in or by the subsequent thermal processing device to the superheated steam.

In an aspect of the invention, a liquid separator is arranged in the slurry extruder before the exit openings.

A relatively high pressure will have to be generated in the slurry extruder to ensure that the slurry strings are formed correctly. It is therefore advantageous to use this high pressure to drain the slurry for any excess liquid.

In an aspect of the invention, the liquid separator comprises at least one sieve.

Forming the liquid separator as a sieve is advantageous in that a sieve is a simple way of ensuring that only liquid leaves the extruder through the liquid separator.

In an aspect of the invention, the exit openings are formed to increase the surface area of the slurry strings.

Forming the exit openings with a star shape, a rectangular shape, a wavy shape or a similar complex shape that will increase the surface area of the slurry strings is advantageous in that the strings hereby can be dried more efficiently and fast.

In an aspect of the invention, the slurry drying plant comprises a feed conveyer arranged to feed the slurry into the slurry extruder.

Hereby is achieved an advantageous embodiment of the invention.

In an aspect of the invention, the slurry has been drained before entering the slurry extruder.

If the slurry is too wet before entering the slurry extruder it can be difficult to form sufficiently coherent strings and it is therefore advantageous to drain the slurry before it enters the extruder.

In an aspect of the invention, the slurry drying plant comprises a dewatering device arranged to reduce the water content in the slurry before it enters the slurry inlet.

In an aspect of the invention, an inside surface of the drying chamber is provided with a non-stick surface such as polytetrafluoroethylene (PTFE), anodized aluminium, ceramics, silicone, enamelled cast iron, or stainless steel.

Forming the drying chamber with a non-stick inner surface is advantageous in that it will reduce the risk of slurry burning onto the surface.

In an aspect of the invention, the slurry extruder comprises adjusting means for adjusting the size of at least some of the exit openings.

Providing adjusting means is advantageous in that it will enable a more versatile extruder more suited for different slurry types.

It should be noted that in this context the term “adjusting means” should be understood as any kind of resilient material forming the openings, any kind of mechanical opening size adjuster or any other kind of adjuster suitable for adjusting the size of at least some of the exit openings.

In an aspect of the invention, the slurry extruder comprises adjusting means for adjusting the size of at least some of the exit openings in response to a slurry pressure inside the slurry extruder and/or the slurry inlet pressure.

Controlling the opening sizes in relation to the pressure in the extruder is advantageous in that it enables a more efficient extruder process.

The invention provides further for method for drying slurry, the method comprising the steps of:

- conveying the slurry through a slurry extruder to force the slurry out of a plurality of exit openings of the slurry extruder to form a plurality of slurry strings,
- drying the slurry strings by guiding superheated steam past the slurry strings, and
- controlling the speed at which the slurry is conveyed through the slurry extruder in response to a slurry inlet pressure at a slurry inlet of the slurry extruder.

Extruding the slurry provides the slurry with a large surface area which will enable an efficient drying process and drying the strings by means of superheated steam is advantageous in that it ensures a fast and efficient drying process where the risk of the strings catching fire due to overheating is eliminated when the conveyer speed is controlled in response to a slurry inlet pressure so that air ingress in the slurry drying plant can be avoided.

In an aspect of the invention, a binding agent is added to the slurry before the slurry is forced out of the plurality of exit openings.

Adding a binding agent to the slurry is advantageous in that a binding agent will help in forming continuous slurry string that will be dried more before breaking off.

In an aspect of the invention, the slurry inlet pressure is measured by detecting a slurry level in a slurry tank arranged above the slurry extruder.

Estimating the slurry pressure at the slurry inlet by detecting the level of slurry in the slurry tank is simple and sufficiently precise in the current circumstances.

In an aspect of the invention, the conveying speed is increased when the slurry inlet pressure increases and wherein the conveying speed is decreased when the slurry inlet pressure decreases.

Increasing the conveying speed when the slurry inlet pressure increases and vice versa is advantageous in that the risk of running the extruder dry or forming air gaps in the slurry flow is hereby reduced.

In an aspect of the invention, the method is performed by means of a slurry drying plant according to any of the previously discussed slurry drying plants.

In an aspect of the invention, the method further comprises the step of leading slurry from the exit openings to a subsequent thermal processing device in which the slurry will be burned, gasified or pyrolyzed.

Subsequently processing the slurry in a thermal processing device is advantageous in that this process hereby can run separately from the initial drying process.

In an aspect of the invention, the method further comprises the step of transferring heat generated in or by the subsequent thermal processing device to the superheated steam.

By utilizing the generated heat in the drying process a very energy efficient slurry drying plant and method is provided.

The invention also provides for use of a slurry drying plant according to any of the previously discussed slurry drying plants for drying slurry having a solid matter content above 5%, preferably above 10% and most preferred above 20%.

If the solid matter content in the slurry is too low the slurry is difficult to handle in the screw conveyers and it is therefore advantageous to ensure that the solid matter content of the slurry is above a certain level to ensure that the viscosity of the slurry is sufficiently high.

FIGURES

Figure 2:
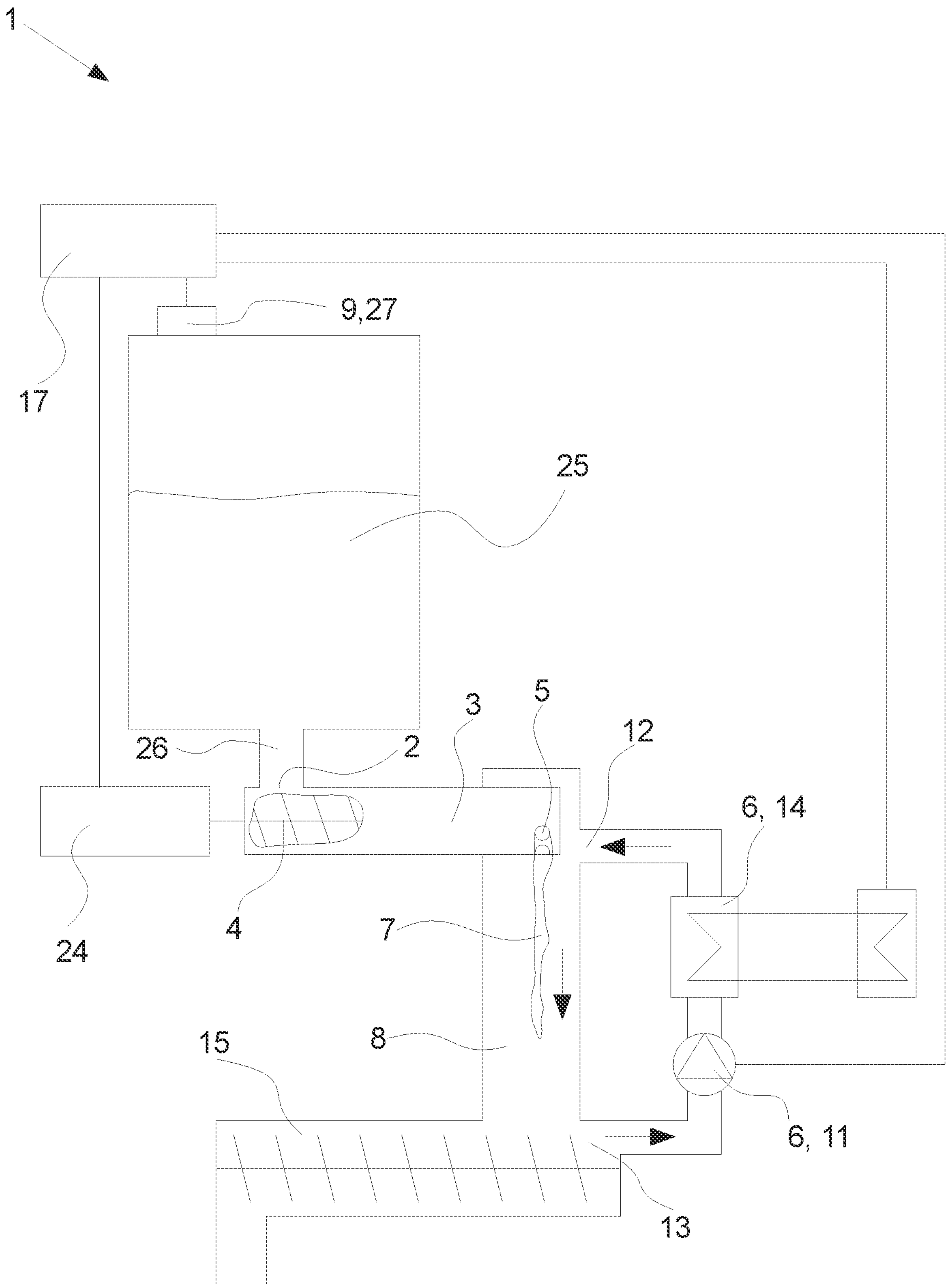
Figure 3:
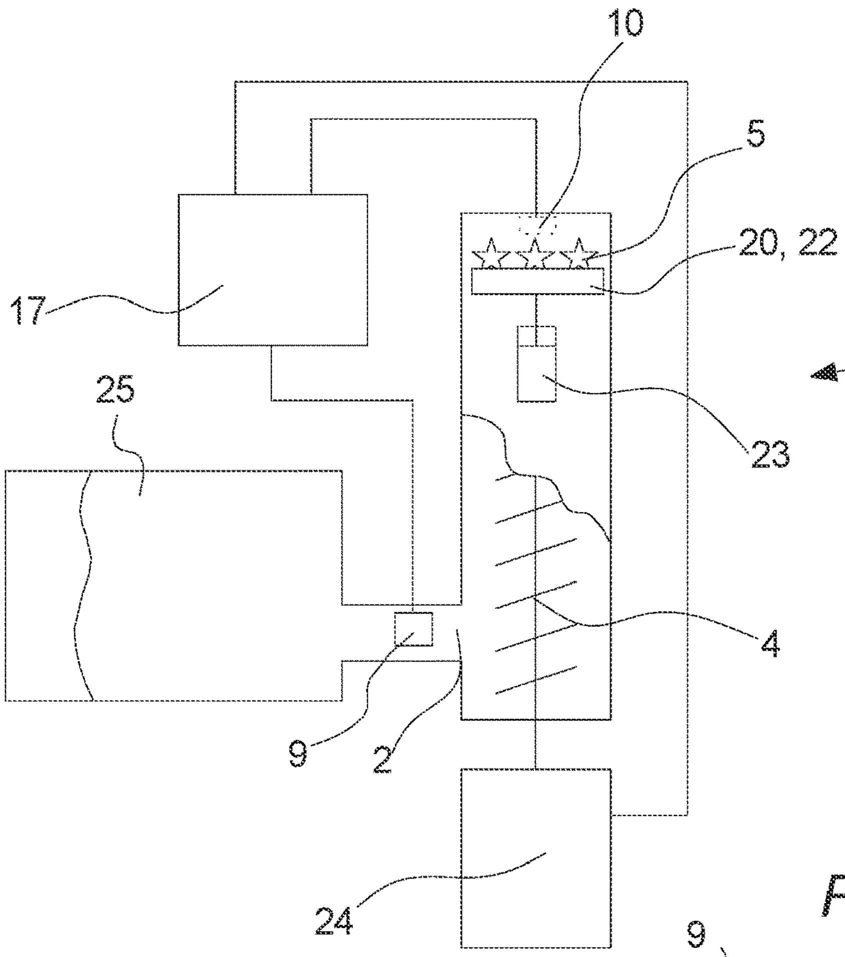
Figure 4:
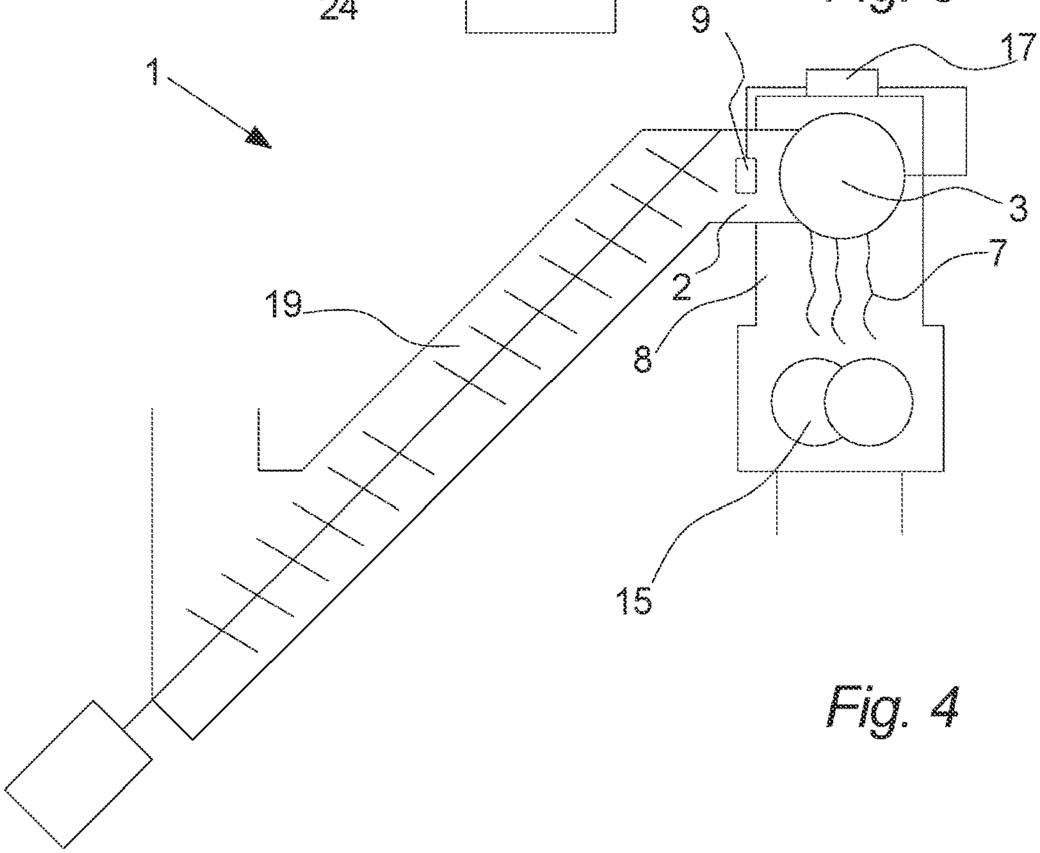

The invention will be described in the following with reference to the figures in which FIG. 1. illustrates a slurry drying plant comprising a vertical extruder, as seen from the side, FIG. 2 illustrates a slurry drying plant comprising a horizontal extruder, as seen from the side, FIG. 3 illustrates a slurry extruder, as seen from the bottom, and FIG. 4 illustrates a slurry extruder and a feed conveyer, as seen from the front.

DETAILED DESCRIPTION

FIG. 1 illustrates an embodiment of a slurry drying plant 1, as seen from the side.

In this embodiment, the slurry drying plant 1 comprises a vertically arranged slurry extruder 3 including conveying means 4 in the form of a screw conveyer. However, in another embodiment, the conveying means 4 could also or instead comprise a conveying chain, a hydraulic or pneumatic piston or another mechanical device suitable for forcing slurry in the extruder 3 out of a plurality of exit openings 5 arranged at the exit end of a slurry extruder 3.

In this embodiment, the slurry extruder 3 is provided with an opening disc 21 provided with a plurality of exit openings 5 so that when the slurry in the extruder 3 is forced against the opening disc 21 by means of the conveying means 4, the slurry is forced out through the exit openings 5 to form slurry string 7 hanging down into the underlying drying chamber 8. In this embodiment, the opening disc 21 is interchangeable so that the opening disc 21 can be changed to an opening disc 21 with a different exit opening configuration—i.e. fewer/more holes, bigger/smaller holes, differently shaped holes and/or other—e.g. in dependence on slurry type, consistence, density or other or simply in response to wear. However, in another embodiment the extruder 3 would not comprise an opening disc 21 and the exit openings 5 would be formed permanently in the extruder structure.

In this embodiment the slurry drying plant 1 further comprises a slurry tank 25 arranged above the slurry extruder 3 so that gravity ensures that the slurry travels from the tank 25 to the extruder 3. The slurry enters the extruder 3 through the slurry inlet 2 arranged at the top of the extruder 3 and in this embodiment the slurry inlet 2 coincides with a slurry conduit 26 arranged at the bottom of the tank 25 arranged to guide slurry from the tank 25 into the slurry inlet 2.

In this embodiment the slurry tank 25 is provided with a level meter 27 in the form of float switch arranged to provide an electrical signal corresponding to the level of slurry in the tank 25. Since the shape (volume) of the tank is constant and since the density of the slurry is substantially constant the level signal is also a measurement of the pressure at the inlet opening 2 and in this embodiment the slurry level is therefore direct evidence of the slurry inlet pressure and the level meter 27 is therefore inlet pressure detection means 9. Thus, in this embodiment the level signal/slurry inlet pressure is transmitted to control means 17 in the form of a PLC which will control the conveying speed of the conveying means 4 in the slurry extruder 3 in response to the signal so that when the inlet pressure increases the conveyance speed it also increased and vice versa.

In this embodiment the control means 17 is also connected to the both the flow means 11 and the steam heating means 14 of the slurry heating means 6 so that the efficiency of the slurry heating means 6 can also be increased in response to a higher inlet pressure or a higher conveyance speed.

The slurry drying plant 1 further comprises slurry heating means 6 arranged to pass superheated steam past the slurry strings 7 in the drying chamber 8. In this embodiment, the slurry heating means 6 is arranged to circulate steam through the drying chamber 8, through flow means 11, through steam heating means 14 and out into the drying chamber 8 again. I.e. in this embodiment at least some of the steam is circulating but in another embodiment, only little of the steam or even none of the steam would be circulating.

In this embodiment, the flow means 11 is arranged to direct the superheated steam flow through the drying chamber 8 in the same direction as the strings 7 are moving through the drying chamber 8. But in another embodiment, the steam could be arranged to flow in the opposite direction, it could be arranged to flow transversal to the direction of the strings and/or the drying chamber 8 could also or instead comprise more than one steam inlet 12 and/or more than one steam outlet 13. Or in another embodiment a steam flow would be established below the drying chamber 8 so that some of the steam from this steam flow would circulated up into the drying chamber so that the bottom opening of the drying chamber 8 would act as both the steam inlet 12 and the steam outlet 13.

Besides the steam inlet 12 and the steam outlet 13, the flow means 11 does in this embodiment comprise an electrically powered blower but in another embodiment the steam flow could also or instead be generated by a fan, a pump, convection or other.

In another embodiment, the steam could also be guided through a cyclone device or a filtering device (not shown) arranged to catch impurities in the steam flow.

In this embodiment, the steam heating means 14 is formed by a heat exchanger providing heat to the steam from a succeeding thermal processing device 15 but in another embodiment the steam heating means 14 could also or instead comprise an electric heating device, a combustion heating device, a heat exchanger arranged to exchange heat with an external heat source or other.

In this embodiment, the slurry is entering the slurry extruder 3 directly through the slurry inlet 2. However, in another embodiment the slurry drying plant 1 could further comprise a dewatering device (not shown) arranged to reduce the water content in the slurry before it enters the slurry inlet 2 e.g. to ensure that the solid matter content in the slurry is sufficiently high, to ensure that the viscosity of the slurry is sufficiently high, to ensure a more efficient drying process or other.

As the slurry constantly will generate more steam during the drying process through evaporation, surplus steam is constantly generated. The surplus steam could be led out of the system by means of a pressure control valve, a safety valve or some other discharge arrangement or in another embodiment the slurry drying plant 1 could further comprise a condensing device (not shown) through which the surplus steam is guided. In such a condensing device, the surplus steam is condensed at a temperature of around 100° C. so that the generated heat can be used for facility heating, it can be used in other heat consuming processes, it can be supplied to an external district heating system or other. In a preferred embodiment, the condensing device would comprise several condensing steps to avoid clogging the condensing device with impurities in the steam.

The dried slurry strings 7 leaving the drying chamber 8 could be stored, distributed on a field or other but in this embodiment, the slurry drying plant 1 further comprises a thermal processing device 15 which in this embodiment is arranged in direct succession of the drying chamber 8 so that the slurry is already hot when entering the thermal processing device 15. However, in another embodiment the thermal processing device 15 could be arranged distant from the drying chamber 8.

In another embodiment, the slurry entering the thermal processing device 15 would first pass through an airlock (not shown) ensuring that flue gasses and other does not escape back to the drying chamber 8.

In the thermal processing device 15 the dried slurry is in this embodiment put through a pyrolysis process. Pyrolysis is a thermochemical decomposition of the organic material in the slurry at elevated temperatures in the absence of oxygen (or any halogen) thereby charring the organic material. How much the temperatures have to be elevated is depending on the specific slurry but in this case the pyrolysis process takes place between 350° C. and 1.200° C.

The pyrolysis process in the thermal processing device 15 generates highly combustible pyrolysis gasses which is lead to a combustion chamber (not shown) in which at least some of the gas is combusted during the supply of air.

In this embodiment slurry drying plant 1 comprises heat transferring means 16 for transferring the very hot gas from the above-mentioned combustion process to the steam heating means 14 in which the heat is used for generating superheated steam. In this embodiment, the steam heating means 14 and the heat transferring means 16 are the same heat exchanger but in another embodiment, these processes could at least partly take place separately.

In another embodiment, the thermal processing device 15 could also or instead be arranged to combust at least parts of the dried slurry so that the heat generated in this combustion process could be led to the steam heating means 14 in which the heat is used for generating superheated steam.

In this embodiment, the slurry extruder 3 is further provided with a liquid separator which in this case is a sieve arranged in the extruder wall at the exit end so that when the conveying means have compressed the slurry to force it out of the exit openings 5 this compression will also press liquid out of the slurry through the sieve.

FIG. 2 illustrates a slurry drying plant 1 comprising a horizontal extruder 3, as seen from the side.

In this embodiment, the slurry extruder 3 is arranged horizontally and the exit openings is arranged in an underside of the sidewall of the extruder 3 so that the slurry strings 7 is hanging substantially vertically downwards when exiting the exit openings 5.

In this embodiment, the drying chamber 8 is formed as a cylindrical tube made from stainless steel. However, in another embodiment the drying chamber 8 could also or instead be made from ceramic, a non-stick surface material such as polytetrafluoroethylene (PTFE), anodized aluminium, silicone, enamelled cast iron or other and or the inside of the drying chamber 8 could comprise a cladding made from one or more of these materials.

In this embodiment the inlet pressure detection means 9 is formed by an ultrasonic level sensor 27 arranged at the top of the slurry tank 25. The pressure signal/level signal will be transmitted to the control means 17 which in turn will control the motor 24 of the extruder 3 and/or the slurry heating means 6 in response.

FIG. 3 illustrates a slurry extruder 3, as seen from the bottom.

In this embodiment, the exit openings 5 are provided with a star shape to increase to surface area of the slurry strings 7 and in this embodiment, the plant 1 is provided with adjusting means 20 arranged to adjust the effective size of the exit openings 5. In this embodiment, the adjusting means 20 is formed as a simple plate 22 arranged to be displaced in front of the exit openings 5 by means of an actuator 23. However, in another embodiment the adjusting means 20 could be formed by making the exit opening surroundings in a resilient material so that the exit openings 5 would expand in response to the slurry pressure.

In this embodiment, the slurry drying plant 1 is provided with an inlet pressure detection means 9 arranged to measure the pressure of the slurry at the slurry inlet 2 and an exit pressure detection means 10 arranged to measure the pressure of the slurry at the exit openings 5. However, in another embodiment only an inlet pressure detection means 9 or only an exit pressure detection means 10 would be provided or the plant 1 could be provided with more pressure detection means.

In this embodiment, the inlet pressure detection means 9 and the exit pressure detection means 10 are both connected to control means 17 so that data regarding the entrance pressure and the exit pressure of the slurry are delivered to the control means 17. In this embodiment, the control means 17 is also connected to the motor 24 driving the conveying means 4 of the extruder 3 and to the actuator 23 of adjusting means 20, so that the operation of the extruder 3 and/or the adjusting means 20 (and/or the slurry heating means 6) may be controlled in response to measurements of the inlet pressure detection means 9 and/or the exit pressure detection means 10.

In another embodiment, only the motor 24 driving the conveying means 4 or only the adjusting means 20 would be controlled by the control means 17 or the control means could also or instead be arranged to control other parts of the plant 1—such as a feed conveyer 19 (see FIG. 4), the slurry heating means 6 and/or other in response to measurements of the inlet pressure detection means 9 and/or the exit pressure detection means 10.

FIG. 4 illustrates a slurry extruder 3 and a feed conveyer 19, as seen from the front.

In this embodiment, is nor equipped with a slurry tank 25 and instead a feed conveyer 19 is provided to convey slurry up into the slurry extruder 3 via the slurry inlet 2. In an embodiment of the invention the operation of the feed conveyer 19 is also controlled by the above-mentioned control means 17 in response to measurements of the inlet pressure detection means 9 and/or the exit pressure detection means 10.

The invention has been exemplified above with reference to specific examples of slurry drying plant 1, slurry extruders 3, slurry heating means 6 and other. However, it should be understood that the invention is not limited to the particular examples described above but may be designed and altered in a multitude of varieties within the scope of the invention as specified in the claims.

LIST

1. Slurry drying plant
2. Slurry inlet
3. Slurry extruder
4. Conveying means
5. Exit openings
6. Slurry heating means
7. Slurry strings
8. Drying chamber
9. Inlet pressure detection means
10. Exit pressure detection means
11. Flow means
12. Steam inlet
13. Steam outlet
14. Steam heating means
15. Thermal processing device
16. Heat transferring means
17. Control means
18. Liquid separator
19. Feed conveyer
20. Adjusting means
21. Opening disc
22. Plate
23. Actuator
24. Motor
25. Slurry tank
26. Slurry conduit
27. Level meter

The invention claimed is:

1. A slurry drying plant comprising a slurry extruder including a slurry inlet and conveyer arranged to convey said slurry through said slurry extruder and force said slurry out of a plurality of exit openings of said slurry extruder to form a plurality of slurry strings, wherein said slurry strings are forced out into a drying chamber in which said plurality of slurry strings are dried, wherein said slurry drying plant further comprises slurry heater comprising flow generator for passing superheated steam past said slurry strings in said drying chamber, and inlet pressure detector for detecting a slurry inlet pressure at said slurry inlet and wherein said slurry drying plant also comprises a controller arranged to control the conveying speed of said conveyer in response to said slurry inlet pressure.

2. A slurry drying plant according to claim 1, wherein said flow generator is arranged to guide said superheated steam flow past said slurry strings substantially in the same direction as the slurry strings are extruded.

3. A slurry drying plant according to claim 1, wherein said drying plant comprises a slurry tank and a slurry conduit arranged to guide said slurry from said slurry tank to said slurry inlet.

4. A slurry drying plant according to claim 3, wherein said slurry tank is arranged above said slurry inlet so that said slurry is guided through said slurry conduit by means of gravity.

5. A slurry drying plant according to claim 3, wherein said inlet pressure detector comprises a level meter arranged to detect a slurry level in said slurry tank.

6. A slurry drying plant according to claim 1, wherein said controller is arranged to control said slurry heater in response to said slurry inlet pressure and/or said conveying speed of said conveyer.

7. A slurry drying plant according to claim 1, wherein said slurry drying plant is arranged for passing said superheated steam past said slurry strings substantially at atmospheric pressure.

8. A slurry drying plant according to claim 1, wherein said plurality of exit openings are arranged at an underside of said slurry extruder so that said slurry strings are primarily extruded downwards.

9. A slurry drying plant according to claim 1, wherein said conveyer is a screw conveyer.

10. A slurry drying plant according to claim 1, wherein said drying plant comprises an exit pressure detector arranged to measure the pressure of said slurry at said exit openings.

11. A slurry drying plant according to claim 10, wherein said drying plant comprises the controller configured to also control the operation of said slurry drying plant in response to input from said exit pressure detector.

12. A slurry drying plant according to claim 1, wherein a liquid separator is arranged in said slurry extruder before said exit openings.

13. A slurry drying plant according to claim 12, wherein said liquid separator comprises at least one sieve.

14. A slurry drying plant according to claim 1, wherein said exit openings are formed to increase the surface area of said slurry strings.

15. A slurry drying plant according to claim 1, wherein an inside surface of said drying chamber is provided with a non-stick surface such as polytetrafluoroethylene (PTFE), anodized aluminium, ceramics, silicone, enamelled cast iron, or stainless steel.

16. A slurry drying plant according to claim 1, wherein said slurry extruder comprises an adjuster for adjusting the size of at least some of said exit openings.

17. A slurry drying plant according claim 16, wherein said slurry extruder comprises the adjuster for adjusting the size of at least some of said exit openings in response to a slurry pressure inside said slurry extruder and/or said slurry inlet pressure.

18. Use of a slurry drying plant according to claim 1 for drying slurry having a solid matter content above 5%.

19. Use of a slurry drying plant according to claim 1 for drying slurry having a solid matter content above 10%.

20. Use of a slurry drying plant according to claim 1 for drying slurry having a solid matter content above 20%.

21. A method for drying slurry, said method comprising the steps of:

conveying said slurry through a slurry extruder to force said slurry out of a plurality of exit openings of said slurry extruder to form a plurality of slurry strings, drying said slurry strings by guiding superheated steam over said slurry strings, and controlling the speed at which said slurry is conveyed through said slurry extruder in response to a slurry inlet pressure at a slurry inlet of said slurry extruder.

22. Method according to claim 21, wherein a binding agent is added to said slurry before said slurry is forced out of said plurality of exit openings.

23. A method according to claim 21, wherein said slurry inlet pressure is measured by detecting a slurry level in a slurry tank arranged above said slurry extruder.

24. A method according to claim 21, wherein said conveying speed is increased when said slurry inlet pressure increases and wherein said conveying speed is decreased when said slurry inlet pressure decreases.

25. A method according to claim 21, wherein said method is performed by a slurry drying plant.

* * * * *